United States Patent [19]

Abbema

[11] Patent Number: 5,033,512
[45] Date of Patent: Jul. 23, 1991

[54] REPLACEMENT PIPE SECTION FOR A DEFECTIVE PIPELINE

[75] Inventor: William D. Abbema, Houston, Tex.
[73] Assignee: Tuboscope Inc., Houston, Tex.
[21] Appl. No.: 309,883
[22] Filed: Feb. 14, 1989
[51] Int. Cl.⁵ .............................................. F16L 55/16
[52] U.S. Cl. ...................................... 138/98; 138/97; 138/155; 29/402.08
[58] Field of Search ................... 138/97, 98, 120, 155; 285/15, 298, 302; 405/150; 29/402.08

[56] References Cited

U.S. PATENT DOCUMENTS

| | | | |
|---|---|---|---|
| 796,781 | 8/1905 | Welsh | 138/97 |
| 1,834,102 | 12/1031 | McCalley . | |
| 2,308,757 | 1/1943 | Hulsberg . | |
| 2,533,097 | 12/1950 | Dale . | |
| 2,651,329 | 9/1953 | Fowler | 138/97 |
| 2,941,822 | 6/1960 | Moecker . | |
| 3,143,146 | 8/1964 | Kennedy | 138/155 |
| 3,404,906 | 10/1968 | Hutton . | |
| 3,826,521 | 7/1974 | Wilhelmsen | 138/97 |
| 3,837,685 | 9/1974 | Miller | 138/97 |
| 4,357,860 | 11/1982 | Krzak . | |
| 4,361,336 | 11/1982 | Reeh et al. | 138/155 |
| 4,373,276 | 2/1983 | Schnell . | |
| 4,413,765 | 11/1983 | Tracy | 138/97 |
| 4,527,322 | 7/1985 | Jackson | 138/97 |
| 4,780,163 | 10/1988 | Haneline et al. | 138/98 |

FOREIGN PATENT DOCUMENTS

| | | | |
|---|---|---|---|
| 1089226 | 9/1960 | Fed. Rep. of Germany | 138/120 |
| 722338 | 1/1955 | United Kingdom | 138/155 |

Primary Examiner—James E. Bryant, III
Attorney, Agent, or Firm—Finnegan, Henderson, Farabow, Garrett & Dunner

[57] ABSTRACT

A replacement pipe section for a defective pipeline that includes two tubular members telescopically assembled so that the assembly has an adjustable overall length. The replacement pipe section includes a collar that can be disposed around and attached to both tubular members, thereby fixing the overall length of the assembly. The ends of the replacement section can then be attached to the fixed open ends of the pipeline to create a fluid-tight assembly. The replacement pipe section is particularly effective for permanently replacing a defective section of an internally coated pipeline.

10 Claims, 1 Drawing Sheet

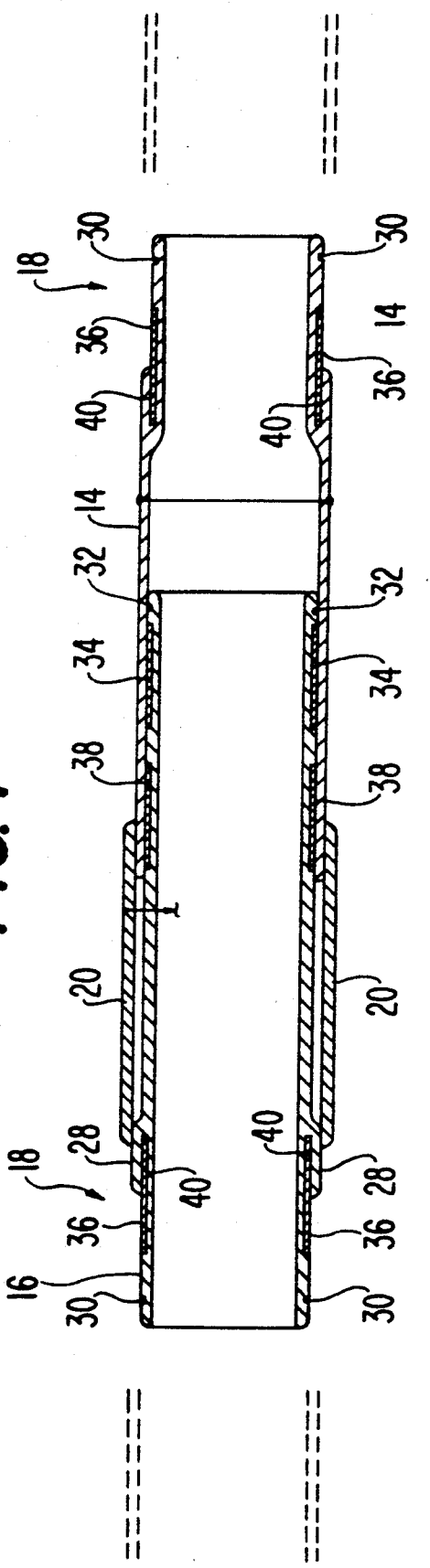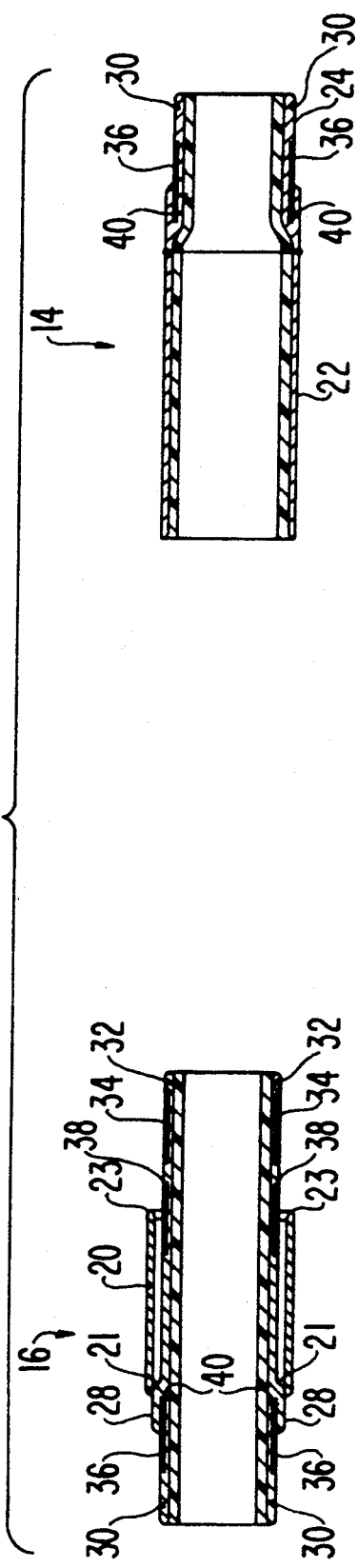

REPLACEMENT PIPE SECTION FOR A DEFECTIVE PIPELINE

BACKGROUND OF THE INVENTION

The present invention relates to pipelines and, more part to a permanent replacement pipe section for a defective pipeline.

Replacement of a leaking or otherwise defective pipeline requires first that the defect be located, followed by excavation of a "bell" hole around the defect large enough to remove the defective section of pipeline.

Currently available permanent replacement pipe sections utilized in the repair of leaking or otherwise defective pipelines require not only sufficient excavation to remove the defective section of pipe but also excavation of approximately 100 to 150 additional feet around each open end of the pipeline to allow space for the installation of flanges to enable attachment of the replacement section of pipe to the open ends of the pipeline. The larger the diameter of the pipeline, the more excavation is required. These prior art replacement pipe sections also require that the length of pipeline inserted into place be the exact length as the pipeline removed.

The above described replacement pipe sections suffer from the disadvantage that the additional excavation around each of the open ends of the pipeline to expose a sufficient length of pipe to allow for installation of the necessary flanges requires a significant amount of labor and is thus costly. In addition, if the repair section of pipeline is not cut to be exactly the same length as the length of pipeline removed, it may be necessary to scrap the length of pipeline or to use additional fittings or flanges. This may result in additional labor and materials being used and may provide a less reliable connection of the new section of pipeline.

Also available in the prior art are external bolt-on patches which can be used to temporarily repair a defective pipeline. However, these bolt-on patches suffer from the disadvantage that the pipeline may continue to erode under the patch and most likely a permanent patch will eventually need to be installed.

It is often advantageous for pipelines to be internally coated with a material that prevents corrosion of the pipeline wall and also prevents the buildup of scale. A problem presented by internally coated lines is that of maintaining the integrity of this internal coating when it is necessary to replace a section of the pipeline. At points where internally coated lines terminate, it is very difficult to maintain the corrosion barrier within the connections.

It is therefore an object of the present invention to provide a replacement pipe section for a defective pipeline that minimizes the amount of excavation that is required to replace the defective section.

It is another object of the present invention to provide a replacement pipe section for a defective pipeline that can be installed in place without the use of flanges.

Another object of the present invention is to provide a replacement pipe section for a defective pipeline that provides a fluid-tight seal between the replacement pipe section and the open ends of the pipeline.

Another object of the invention is to provide a replacement pipe section for a defective pipeline that eliminates the necessity that the replacement pipe section be the exact length as the defective pipe section removed.

A further object of the invention is to provide a replacement pipe section for a defective internally coated pipeline that effectively maintains the integrity of the internal coating and thus is capable of transporting corrosive materials.

A further object of the invention is to provide a replacement pipe section for a defective pipeline that is permanent, easy to install and cost effective.

SUMMARY OF THE INVENTION

The present invention, as embodied and broadly described herein, overcomes the problems and disadvantages of the prior art and achieves the aforementioned objects in accordance with the purpose of the invention by providing a replacement pipe section for a defective pipeline which comprises first and second telescopically assembled tubular members having extreme outer open opposite ends. These members are slidable coaxially relative to one another for sealably inserting each extreme end of the tubular members into a respective fixed open end of the pipeline. The replacement pipe section further includes a tubular collar slidable axially along one of the first and second tubular members for slidably engaging the other of the first and second tubular members. The replacement pipe section also includes means for fastening the collar to both the first and second tubular members for holding each extreme outer end of the tubular members in the respective fixed open ends of the pipeline.

The replacement pipe section of the present invention enables a defective length of pipeline to be replaced without the necessity of providing flanges at each end of the replacement section, thereby substantially reducing the amount of excavation required around each open end of the pipeline to allow space for installation of the replacement pipe section. The replacement pipe section of the invention provides a permanent, fluid-tight connection at each end of the pipeline section by means of the telescoping tubular member which eliminates the requirement that the replacement section be exactly equal in length to the length of pipeline removed. In addition, the replacement pipe section of the invention preferably is utilized to replace a defective section of an internally coated pipeline. The replacement section can itself be internally coated and thus enables the integrity of the pipeline internal coating to be maintained.

The accompanying drawings, which are incorporated in and constitute a part of this specification, illustrate a preferred embodiment of the invention, and together with the description, serve to explain the principles of the invention.

BRIEF DESCRIPTION OF THE DRAWINGS

FIG. 1 is a diagram of the replacement pipe section of the present invention in the assembled position illustrating how it can function as a replacement for a removed piece of defective pipeline.

FIG. 2 is a diagram illustrating the individual pieces of the replacement pipe section.

DETAILED DESCRIPTION OF THE PREFERRED EMBODIMENTS

Reference will now be made to the preferred embodiments of the invention, examples of which are illustrated in the accompanying drawing.

In accordance with the present invention, as illustrated in FIG. 1, replacement pipe section generally referred to as 12 is provided for a defective pipeline (shown in phantom). The defective section of pipeline is removed leaving fixed open ends in spaced opposing relationship. Replacement pipe section 12 comprises a first tubular member 14 and a second tubular member 16 which can be telescopically assembled, with the assembly having extreme outer open opposite ends 18. First tubular member 14 and second tubular member 16 are slidable coaxially relative to one another with the inside diameter of first tubular member 14 machined within a specified tolerance to correspond to the outside diameter of second tubular member 16. Therefore, second tubular member 16 can slide inside first tubular member 14. As a result, the overall length of replacement pipe section 12 is adjustable. Extreme outer open opposite ends 18 of replacement pipe section 12 can be sealably inserted into the respective fixed open ends of a pipeline (shown in phantom). The outside diameter of extreme outer open opposite ends 18 of replacement pipe section 12 are machined within a specified tolerance to correspond to the inside diameter of the pipeline. As a result, replacement pipe section 12 can be inserted in place of a removed section of defective pipeline. It is preferred that replacement pipe section 12 be constructed of the same material as the pipeline and if the pipeline is internally coated, replacement pipe section 12 is preferably internally coated with the same material.

In accordance with the invention, first tubular member 14 and second tubular member 16 are fastened together by means of a collar 20 which is attached at first end 21 to second tubular member 16 by means such as welding. Second end 23 of collar 20 is capable of slidably coaxially engaging with second tubular member 16. Collar 20 can be fastened to first tubular member 14 by means such as welding to allow extreme outer open opposite ends 18 of the slidably engaged first and second tubular members 12 and 14 to be held in place in the respective open ends of the pipeline (shown in phantom).

In accordance with the invention and as illustrated by FIG. 2, first tubular member 14 preferably comprises a main portion 22 and an end portion 24. End portion 24 has an outside diameter corresponding to the inside diameter of main portion 22 and end portion 24 is preferably welded to main portion 22. Second tubular member 16 includes a sleeve 28 which is attached to and disposed around the outside of second tubular member 16. Sleeve 28 has an outside diameter equal to the outside diameter of main portion 22 of first tubular member 14. Collar 20 has an inside diameter that is machined within a specific tolerance to correspond to the outside diameter of main portion 22 of first tubular member 14 and sleeve 28 of second tubular member 16. Sleeve 28 is provided so that collar 20 can slidably engage around the perimeter of second tubular member 16. Collar 20 thus can be positioned so as to slidably engage around both sleeve 28 of second tubular member 16 and main portion 22 of first tubular member 14. By welding or otherwise affixing collar 20 around sleeve 28 and main portion 22, first tubular member 14 and second tubular member 16 can be joined together.

In accordance with the invention, extreme outer open opposite ends 18 of replacement pipe section 12 preferably contain sealing means 30, such as O-rings, around their perimeters to enable sealable engagement with the fixed open ends of the pipeline. Therefore, replacement pipe section 12 can be inserted in fluid-tight engagement with the fixed open ends of the pipeline. In addition, the end of second tubular member 16 which engages with first tubular member 14 also preferably contains sealing means 32, such as O-rings, around its perimeter thereby enabling fluid-tight engagement between first and second tubular members 14 and 16.

In accordance with the invention, a portion of second tubular member 16 which engages with first tubular member 14 preferably includes a wear strip 34 around its perimeter to enable slidable engagement of second tubular member 16 within first tubular member 14. This wear strip 34 should be composed of a material capable of sliding within, without scratching, the inside surface of first tubular member 14 and should also be pliable. A preferred material for wear strip 34 is teflon. Wear strip 34 should extend an incremental distance beyond the outside diameter of second tubular member 16 so that wear strip 34 contacts the inside of first tubular member 14 thus preventing contact between the surfaces of first and second tubular members 14 and 16. Wear strip 34 also acts to maximize the sealing capabilities of sealing means 32. Wear strip 34 preferably extends from 0.005 to 0.010 inches beyond the outside diameter of second tubular member 16.

In accordance with the invention, if the pipeline is internally coated, a portion of both first tubular member 14 and second tubular member 16 adjacent extreme outer open opposite ends 18 preferably includes a heat shield 36 located around the perimeter of each to prevent the penetration of heat from reaching the internal coating on both first and second tubular members 14 and 16 when first and second tubular members 14 and 16 are attached by welding to the open ends of the pipeline. Heat shield 36 may extend into slots 40 located between main portion 22 and end portion 24 of first tubular member 14 and between sleeve 28 and second tubular member 16. Slot 40 may be used, if necessary, to prevent penetration of heat from reaching the internal coating of first and second tubular members 14 and 16 when first and second tubular members 14 and 16 are welded to the open ends of the pipeline or when collar 20 is welded to second tubular member 16. In addition, the portion of second tubular member 16 that is adjacent to second end 23 of collar 20 in the assembled replacement pipe section 12 is also preferably provided with a heat shield 38 to prevent the penetration of heat from reaching the pipeline internal coating when welding collar 20 to first tubular member 14. If heat is allowed to penetrate to the inside of replacement pipe section 12, the internal coating may be destroyed with resulting eventual corrosion of the pipeline. Heat shield 36 and 38 preferably is composed of a silica-type material which is capable of protecting the pipe from temperatures up to 3,000° F.

In accordance with the invention, replacement pipe section 12 can be utilized to replace a defective section of pipeline. First, a sufficient area of ground is excavated to enable removal of the defective section. Replacement pipe section 12 can then be inserted into place between the fixed open ends of the pipeline. Replacement pipe section 12 can then be telescopically expanded by moving first and second tubular members 14 and 16 relative to one another until extreme outer open opposite ends 18 of replacement pipe section 12 engage with the fixed open ends of the pipeline. Collar 20, which has already been welded or otherwise attached to sleeve 28 of second tubular member 16, can then be welded or otherwise attached to main portion 22 of first tubular member 14 and extreme outer open opposite ends 18 can then be attached to the fixed open ends of the pipeline thereby locking replacement pipe section 12 in fluid-tight engagement with the pipeline.

Although replacement pipe section 12 of the invention can be attached to the fixed open ends of the pipeline by any means opposite ends 18 be attached to the pipeline by use of an attachment sleeve (not shown) made of the same material as the pipeline. An example of such an attachment sleeve is the ThruKote TM sleeve manufactured by AMF Tuboscope. Attachment sleeves can be inserted between extreme outer open opposite ends 18 of replacement pipe section 12 and the fixed open opposite ends of the pipeline and welded into place without requiring the use of bulky flanges.

In accordance with a preferred embodiment of the invention, the replacement pipe section is coated with a corrosion-resistant material thus making it particularly effective for replacing a defective section of pipeline that is also internally coated with the same corrosion-resistant material. Examples of coating materials that are applied to the inside of pipelines include phenolic compounds, epoxy polyamides, urethanes and powder coatings. By utilizing the internally coated replacement pipe section of the invention and attaching the replacement pipe section to the fixed open ends of the pipeline with an attachment sleeve that is also internally coated, the integrity of the pipeline internal coating can be maintained.

Although the present invention has been describe in connection with preferred embodiments, it is understood that modifications and variations may be resorted to without departing from the spirit and scope of the invention. Such modifications are considered to be within the purview and scope of the invention and the appended claims.

I claim:

1. A replacement pipe section for a defective pipeline having fixed open ends in spaced opposing relationship, said replacement section comprising:
   first and second tubular members adapted for telescopic assembly and having extreme outer open opposite ends, said members being slidable coaxially relative to one another for sealably inserting each extreme end of the tubular members into a respective fixed open end of the pipeline;
   a tubular collar fastened to one of the first and second tubular members and adapted for slidably engaging the other of the first and second tubular members in a telescopic assembled position;
   means for fastening the collar to the other of the first and second tubular members in said telescopic assembled position to hold each extreme outer end of both the first and second tubular members in the respective spaced fixed open ends of the pipeline;
   a corrosion-resistant material coating the inner surface of said first and second tubular members; and
   a heat shield material disposed around the outer surface of a portion of said first and second tubular members adjacent the outer open ends and disposed around the outer surface of a portion of said second tubular member adjacent the end of said collar that slidably engages with said first tubular member, said heat shield material constituting a means to prevent the penetrating of heat from reaching the internal coating on both first and second tubular members as said first and second tubular members are attached by welding to the open ends of the pipeline.

2. The replacement pipe section of claim 1, wherein said first tubular member comprises a main portion and an end portion, one end of said end portion being attached to an fixably engaged within said main portion and the other end of said end portion being capable of sealably engaging with one fixed open end of said pipe line, and wherein one end of said second tubular member is capable of slidably engaging within said main portion of said first tubular member and the other end of said second tubular member is capable of sealably engaging with the other fixed open end of said pipe line.

3. The replacement pipe section of claim 2, wherein the collar fastening means includes a sleeve disposed around said second tubular member dimensioned and configured to slidably receive said tubular collar.

4. The replacement pipe section of claim 3, wherein said collar is fastened to said main portion of said first tubular member and to said sleeve on said second tubular member for fixing the length of the replacement section.

5. The replacement pipe section of claim 4, wherein said collar is fastened by welding.

6. The replacement pipe section of claim 2, further comprising sealing means disposed around the outer surface of the outer ends of said first and second tubular members to provide sealable engagement with the pipeline.

7. The replacement pipe section of claim 2, further comprising a wear strip disposed around the outer surface of a portion of said second tubular member that engages with said first tubular member.

8. The replacement pipe section of claim 2, further comprising sealing means disposed around the outer surface of the second tubular member adjacent said first tubular member.

9. The replacement pipe section of claim 6, wherein said sealing means is an O-ring.

10. The replacement pipe section of claim 8, wherein said sealing means is an O-ring.

* * * * *